United States Patent [19]
Wolf et al.

[11] Patent Number: 5,059,357
[45] Date of Patent: Oct. 22, 1991

[54] VORTEX CHAMBER ATOMIZER

[76] Inventors: Hartmut Wolf, Schwimmbadstrasse 11, 6146 Lindelfels; Norbert Caernawski, Lessingstrasse 21, 6140 Benzheim 3, both of Fed. Rep. of Germany

[21] Appl. No.: 531,863

[22] Filed: Jun. 1, 1990

[30] Foreign Application Priority Data

Jun. 5, 1989 [DE] Fed. Rep. of Germany ... 8906889[U]

[51] Int. Cl.[5] ........ B01F 3/04

[52] U.S. Cl. ........ 261/53; 261/62; 261/79.1; 261/79.2

[58] Field of Search ........ 261/79.1, 79.2, 62, 261/53

[56] References Cited

U.S. PATENT DOCUMENTS

| | | | |
|---|---|---|---|
| 1,970,169 | 8/1934 | Godward | 261/79.1 |
| 2,653,801 | 9/1953 | Fontein et al. | 261/79.2 |
| 3,591,148 | 7/1971 | Schmitz | 261/79.1 |
| 3,998,612 | 12/1976 | Lundy | 261/62 |
| 4,470,798 | 9/1984 | Graat et al. | 431/9 |
| 4,726,686 | 2/1988 | Wolf et al. | 261/79.2 |

FOREIGN PATENT DOCUMENTS

| | | | |
|---|---|---|---|
| 213329 | 3/1987 | European Pat. Off. . | |
| 477204 | 7/1929 | Fed. Rep. of Germany | 261/79.2 |
| 2828319 | 1/1980 | Fed. Rep. of Germany . | |

*Primary Examiner*—Tim Miles
*Attorney, Agent, or Firm*—Dilworth & Barrese

[57] ABSTRACT

A vortex chamber atomizer has a housing consisting of an axially extending casing and end plates which shut off the ends of the casing and of which one has an inlet nozzle therein and the other end plate has an outlet pipe therein, there furthermore being at least two tubular connectors extending through the casing so that the center lines of such connectors are at a distance from, and a right angle to the axis of the housing.

In order to obtain an air-liquid mixture with ideal turbulence while avoiding prior segregation within the vortex chamber the housing contains annularly extending internal structures running at a right angle from the face of the casing in a circumferential direction. These internal structures extend into the interior of the housing in such a manner that a cavity is defined in the housing, which is adapted in form to the primary vortex produced in the vortex chamber atomizer.

20 Claims, 8 Drawing Sheets

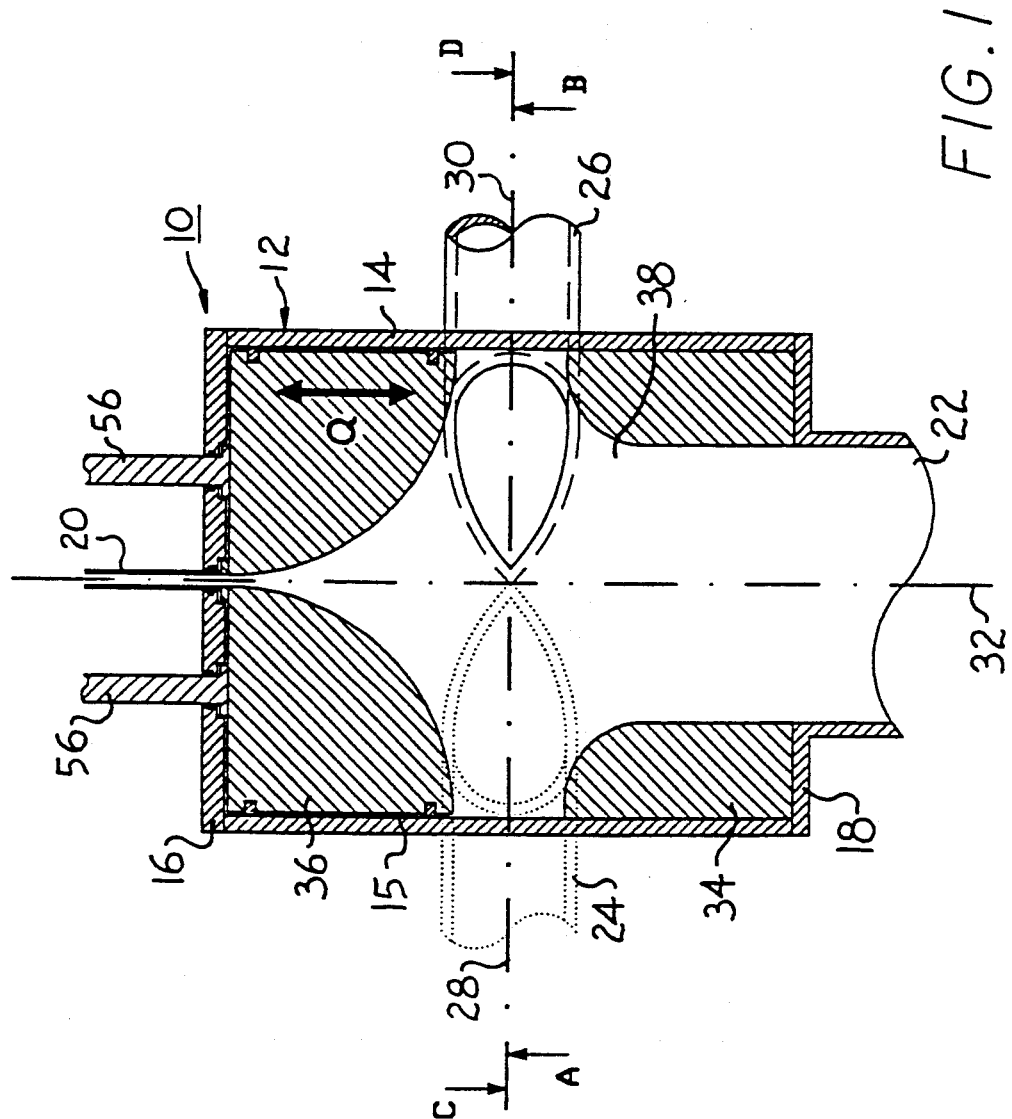

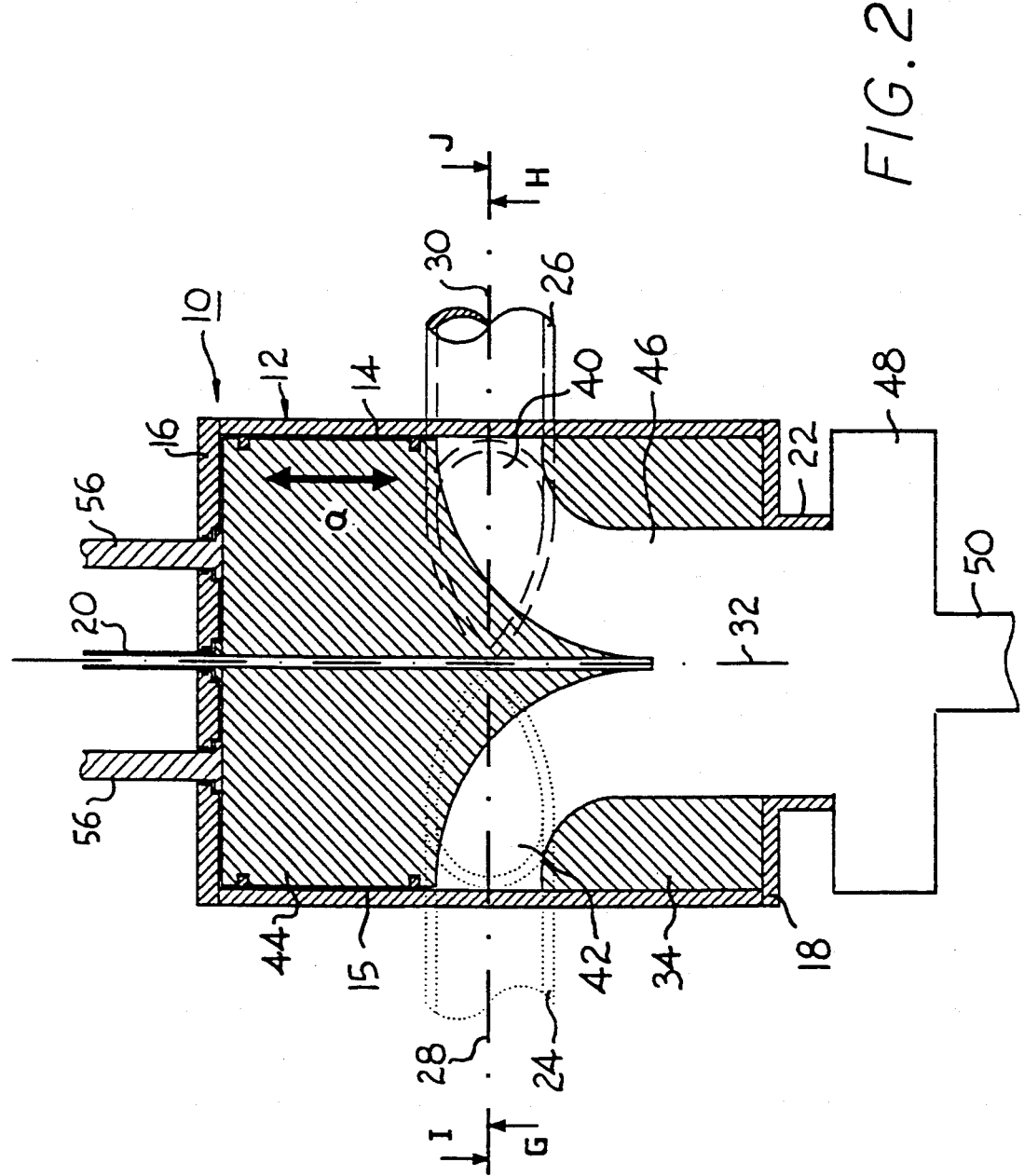

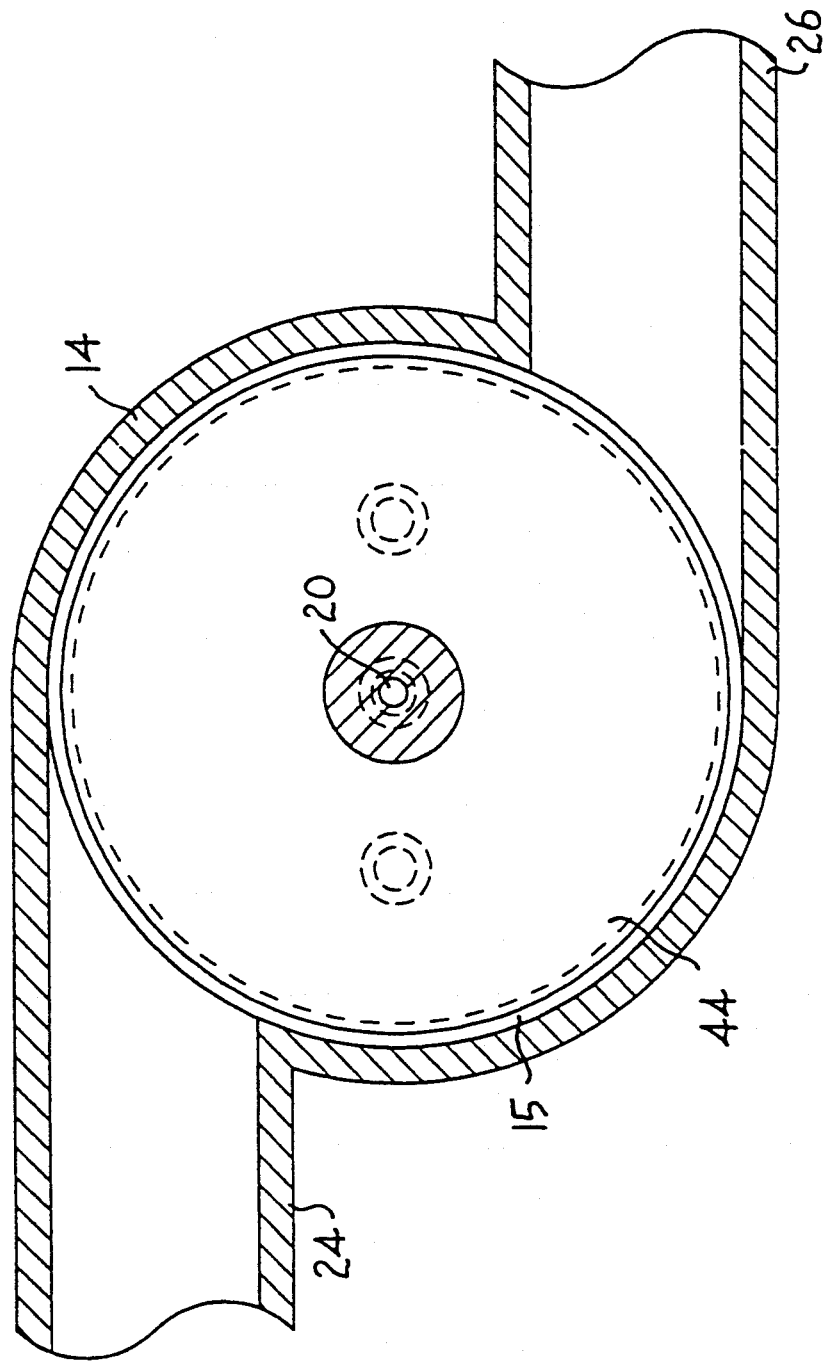

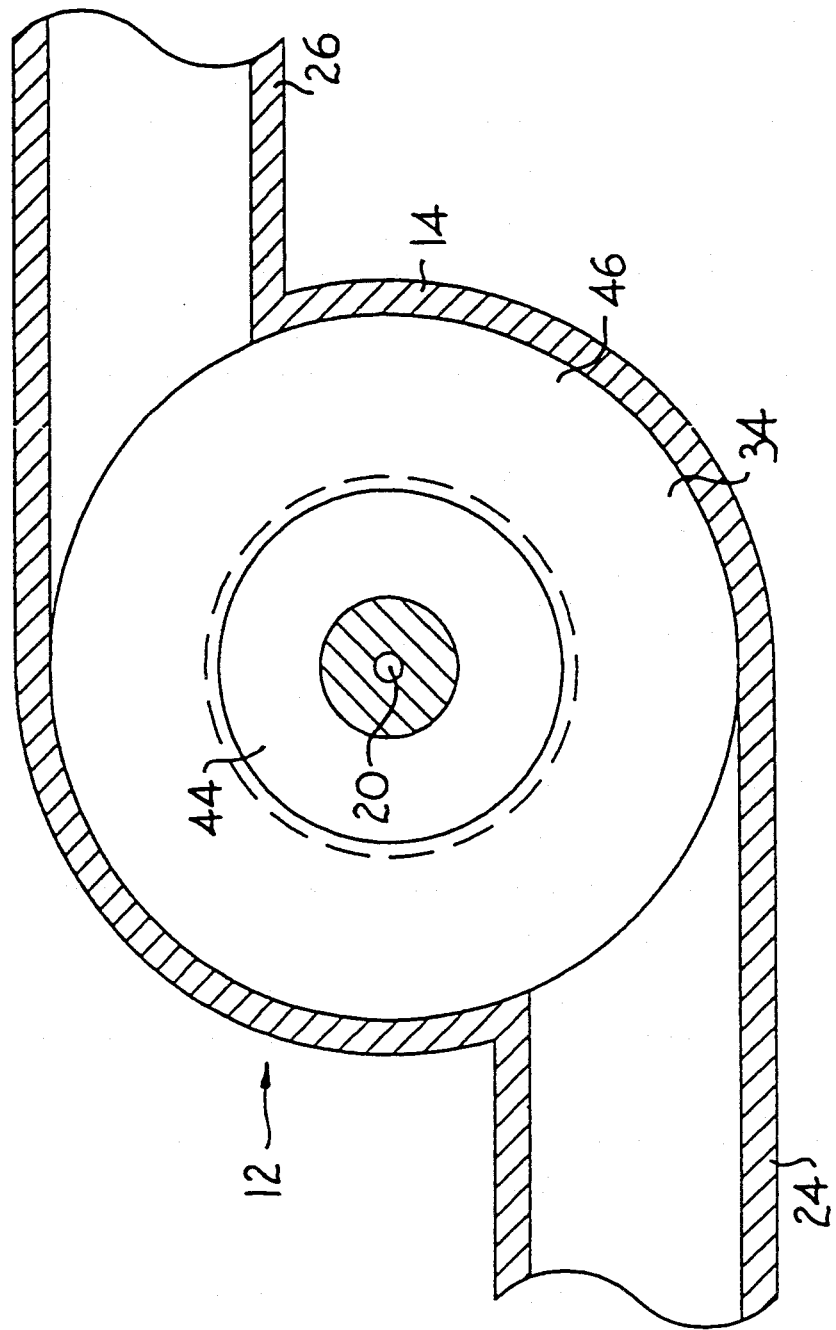

VORTEX CHAMBER ATOMIZER

The invention relates to a vortex chamber atomizer with a housing consisting of an axially extending casing and end plates which shut off the ends of the casing and of which one has an inlet nozzle therein and the other end plate has an outlet pipe therein, there furthermore being at least two tubular connectors extending through the casing so that the center lines of such connectors are at a distance from the axis of the housing running generally at a right angle thereto.

Vortex chamber atomizers of this type have been proposed, for instance in European patent publication EP-A 213 329. This prior art vortex chamber may, for instance, be used as a carburetor of an IC engine or as the atomizer of a burner or of a jet engine. The fluid fuel entering the vortex chamber is acted upon by air flowing into the chamber through the tubular connectors and forming a centered and converging vortex, so that such fuel is atomized as fine fuel droplets and is finely divided. The turbulent fuel-air jet passes through the outlet pipe into the corresponding combustion chamber, for example the combustion chamber of an IC engine, or some other combustion device. Owing to the unfavorable flow conditions obtaining in the interior of this prior art vortex chamber atomizer, it is not possible to ensure ideal atomization of the fuel within the vortex chamber. This is to be seen from the fact that exhaust gas tests performed on the IC engine fed from such a vortex chamber produced unsatisfactory results. More particularly, it was noted that even within the vortex chamber itself there was undesired segregation of the components of the mixture and thus a collection of the liquid in the corner parts between the casing and the end plates.

The German patent publication DE-A 2,828,319 describes a vortex chamber atomizer of the type in question, which is referred to as being the atomizer of a burner. This atomizer as described also possesses a cylindrical atomizing chamber in which however the flow conditions are quite as unsuitable as in the other prior art already reviewed.

One object of the present invention is thus to so improve the vortex chamber atomizer of the type referred to that at its outlet it supplies a liquid-mixture with turbulence which is, as far as possible, ideal.

A further aim of the invention is to avoid prior segregation of the mixture within the vortex chamber.

Thus, in the case of use of the vortex chamber atomizer as a carburetor for an IC engine or as some other form of atomizer, one objective is to obtain the best possible turbulence-treated fuel-air mixture whose segregation is prevented so that the level of toxic exhaust gas components from the following IC engine or burner is substantially minimized.

In order to achieve these or other objects appearing from the present specification, claims and drawings, in the present invention internal structures are provided in the housing so as to extend from the face of the casing in a circumferential manner and so that a cavity is defined in the interior of the housing which is substantially adapted to the form of the primary vortex produced in the vortex chamber atomizer. This design is based on the recognition that owing to the air tangentially entering through the connectors an ideal primary vortex results centered on the axis which has a high rotational speed and thus leads to a fine atomization of the engine or burner fuel or other liquid entering the vortex chamber through the inlet nozzle. However, in addition to the primary vortices, flow areas are defined with a secondary flow phenomena in which substantially lower flow speeds occur. The result of this is that within such areas the previously atomized and turbulent fuel-air mixture segregates again. Such flow areas are formed preferentially in the edge zone between the casing and end plates. The annularly extending internal structures, which as far as possible are adapted to the form of the primary vortex produced by the vortex chamber, however mean that the formation of such secondary vortex or turbulence zones is precluded. Accordingly undesired segregation of the previously atomized liquid or fuel mixture is suppressed.

It is furthermore possible to assume that the internal structures in accordance with this invention lead to an additional increase in the acceleration of the speed of rotation both towards the inlet nozzle and also towards the outlet port. It is in fact in this direction that there is a respective decrease in the diameter of the internal structures. In the case of rotating gas flows the speed of rotation increases with a decrease in diameter, so that in conjunction with the internal structures there is the effect of the above-noted acceleration and thus an improved atomization.

The ideal primary vortex centered on the axis not only has a high component of speed of rotation, but also an axial speed component. In this respect owing to the internal structures in accordance with the invention the flow is abruptly deflected directly under the inlet nozzle in the vortex chamber, such deflection leading to an additional shear component within the flow, which involves an additional atomizing effect. Furthermore, because of their inertia, large drops are slung outward and impinge on the internal structures in accordance with the invention where they form a film running downwards in the direction of gravitational action, and such drops are immediately entrained again and thus atomized owing to the high speed of rotation of the outer areas of the primary vortex. This was not possible in the prior art, since after entering the secondary vortex zones with a low flow speed, the outwardly flung drops could not be swept clear of the chamber wall again.

The fuel, with a practically ideal distribution in the primary vortex, emerges with the vortex rotating at a high speed into the outlet pipe leading into the combustion chamber. Here it is possible for the ideally mixed fuel mixture to be combusted with an optimum use of the atomized fuel. The vortex chamber atomizer is in this respect so effective that, unlike the atomizer in accordance with European patent publication EP-A 213,329, it may be used for purely atomizing application without being followed by a centrifugal chamber, since there are now no drops of such a size that they have to be flung clear.

Accordingly it is possible, when the vortex chamber atomizer is used in a carburetor, for the fuel with a practically ideal distribution within the primary vortex to enter the outlet pipe leading to the combustion chamber, the vortex rotating at a high speed. In the combustion chamber it is possible for the ideally mixed fuel mixture to be burned with an optimum use of the atomized fuel.

It is more particularly advantageous if the internal structures are respectively arranged in both corner zones between the casing and the end plates.

This arrangement may be so further developed that in the one case the internal structures project forward along that end plate with the outlet pipe opening in it as far as the zone of opening or termination of the outlet pipe. In the other case a design is possible in which the internal structures placed in the edge zone between the casing and the end plate, into which the inlet nozzle opens, are also drawn forward more or less as far as the opening of the inlet nozzle.

The internal structure may be arranged to extend along the casing wall as far as the openings of the connectors.

The center lines of the connectors may be arranged in a common center plane intersecting with the axis of the housing.

In accordance with a further advantageous embodiment of the invention the internal structures are only provided in the edge zone between the casing and the end plate with outlet pipe opening into it. At the same time the connectors passing through the casing are able to have their port parts choked and decreased in cross section by an axially sliding cover element down to any desired size of cross section. This means that the input volumetric air flow and thus the richness of the fuel-air mixture may be adjusted.

The vortex chamber atomizer in accordance with the invention may also be advantageously combined with a centrifugal chamber of the type proposed in European patent publication 213,329. In this case the outlet pipe of the vortex chamber atomizer opens as an inlet pipe into a centrifugal chamber, which is generally coaxially provided with an outlet pipe. The inner ends of the inlet and outlet pipes are spaced apart by an intermediate distance, the chamber walls surrounding the zone between such inner ends with a clearance. Furthermore, radially outside the inlet and the outlet pipes, the chamber has an outlet or draw-off pipe. The centrifugal chamber is accordingly, as already proposed in European patent publication 213,329, constituted by the chamber surrounding the inner ends of the inlet and outlet pipes. Between the inner ends of the inlet and outlet pipes of this centrifugal chamber a stationary vortex is formed, from which any large or heavy drops or particles formed by coalescence of smaller ones, may be separated by centrifugal action.

It has turned out to be an advantage that the vortex chamber atomizer in accordance with the invention also may be employed for air purification, if water, or indeed another liquid, is sprayed into the inlet nozzle in order to wet dust particles. The wetted dust particles may be drawn off, more particularly when using the above mentioned centrifugal chamber, it also may be possible for gases to be dissolved in the wetting liquid which are to be removed by scrubbing.

The vortex chamber atomizer also may be used for liquid-liquid dual phase mixtures. Thus, it may be employed in sewage works or in refining plants. The apparatus in accordance with the invention may also be utilized for the production of emulsions and mixtures and for the separation thereof into their phases.

Further features and advantages of the invention will be gathered from the ensuing description of two embodiments thereof referring to the drawings.

FIG. 1 shows a diagrammatic cross section taken through a first embodiment of a vortex chamber atomizer.

FIG. 2 is a diagrammatic cross section taken through a second possible form of a vortex chamber atomizer.

FIG. 2A is a cross-sectional view of the vortex chamber atomizer of FIG. 2 taken along line G-H facing toward the inlet nozzle.

FIG. 2B is a cross-sectional view of the vortex chamber atomizer of FIG. 2 taken along line I-J facing toward the outlet pipe.

Figure 1A:
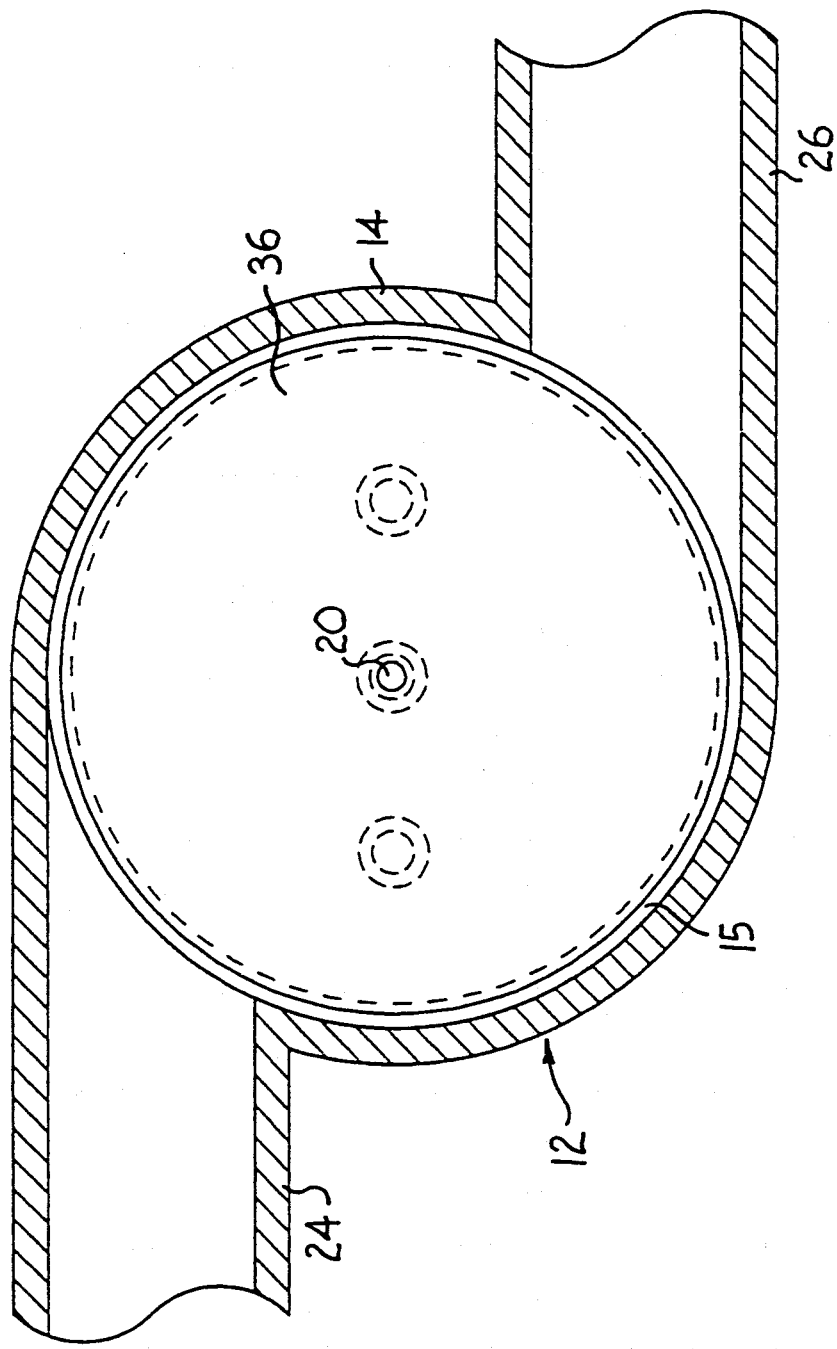
FIG. 1A is a cross-sectional view of the vortex chamber atomizer of FIG. 1 taken along line A-B facing toward the inlet nozzle.
Figure 1B:
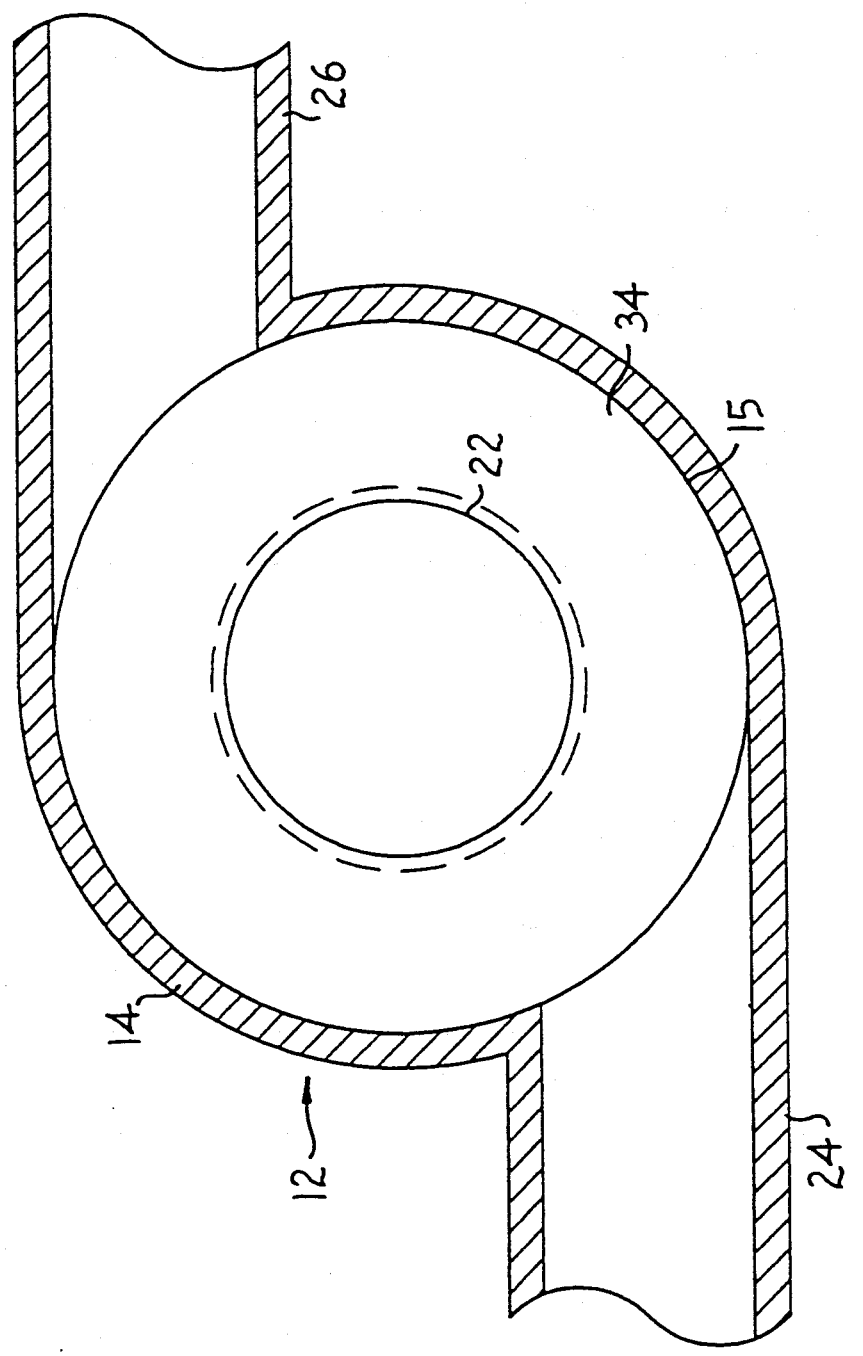
FIG. 1B is a cross-sectional view of the vortexd chamber atomizer of FIG. 1 taken along line C-D facing toward the outlet pipe.

The vortex chamber atomizer 10 in accordance with FIG. 1, FIG. 1A and FIG. 1B consists of a cylindrical housing 12, which at its ends is shut off by first and second end plates 16 and 18 connected with it. In the transverse center plane of the casing 14 of the vortex chamber atomizer 10, two tubular connectors 24 and 26 are connected, which are offset from each other by 180°. The connectors 24 and 26 are open tangentially into the casing 14 of the vortex chamber atomizer 10. Owing to the offset through 180° of the tubular connectors 24 and 26 the center lines 28 and 30 of the connectors 24 and 26 are parallel to each other. The center lines 28 and 30 of the connectors 25 and 26 are spaced from, and approximately at a right angle to the axis 32 of the housing of the vortex chamber atomizer 10 at a right angle.

An outlet pipe 22 opens in the second end plate 18 of the vortex chamber atomizer 10. An inlet nozzle 20 is arranged in the first end plate 16. The center lines of the outlet pipe 22 and of the inlet nozzle 20 are aligned with the axis 32 of the housing.

Internal structures 34 and 36 are arranged annularly adjoining the casing so as to extend circumferentially within the housing 12. These internal structures 36 engage on the one hand the surface 15 of the casing and on the other hand the first end plate 16 and fill up the area adjacent to the inner edge between the casing surface 15 and the first end plate 16. In this respect the internal structures are drawn forward along the end plate as far as the port of the inlet nozzle 20 by slides 56 and extend along the casing surface 15 as far as the zone into which the connectors 24 and, respectively, 26 open.

Further, internal structures 34 extend between the casing 14 and the second end plate 18, in which the outlet pipe 22 opens forming cavity 38. Here as will the internal structures 34 are drawn forward as far as the opening of the outlet pipe 22 on the one hand and, on the other, as far as the opening area of the connectors 24 and, respectively, 26 in the casing. The surface, turned towards the interior of the housing 12, of the internal structures 34 and, respectively, 36 is convexly curved in an outward direction and its geometry is substantially adapted to the primary vortex which becomes established.

In the case of the use of a vortex chamber atomizer in accordance with this embodiment of the invention as a vortex chamber carburetor in an IC engine, the toxic exhaust gas components, which emerge from the engine fed by the vortex chamber carburetor, may be substantially reduced in amount.

The design of the vortex chamber atomizer 10, which is shown in FIG. 2, FIG. 2A and FIG. 2B, is to a large extent identical to that of FIG. 1. However, this embodiment does not have any internal structures 36 between the casing 14 and the first end plate 16 fitted with the inlet nozzle 20.

Within the housing 12 an axially sliding cover element 44 is arranged so that it may be adjusted axially in the direction of the double arrow denoted as "a" in FIG. 2 by slides 56. The cover element 44 makes it possible for the connectors 40 and, respectively, 42 opening in the casing face 15 to be covered over adjusting the size of cavity 46. This means that the volumetric air flow supplied and thus the ratio of the fuel and air mixture may be steplessly adjusted.

Where a centrifugal chamber 48 is to be employed, outlet pipe 22 of the vortex chamber atomizer 10 opens as an inlet pipe into the centrifugal chamber as shown in FIG. 2. The centrifugal chamber 48 is further provided with an outlet pipe 50 coaxial with the outlet pipe 22.

Figure 3:
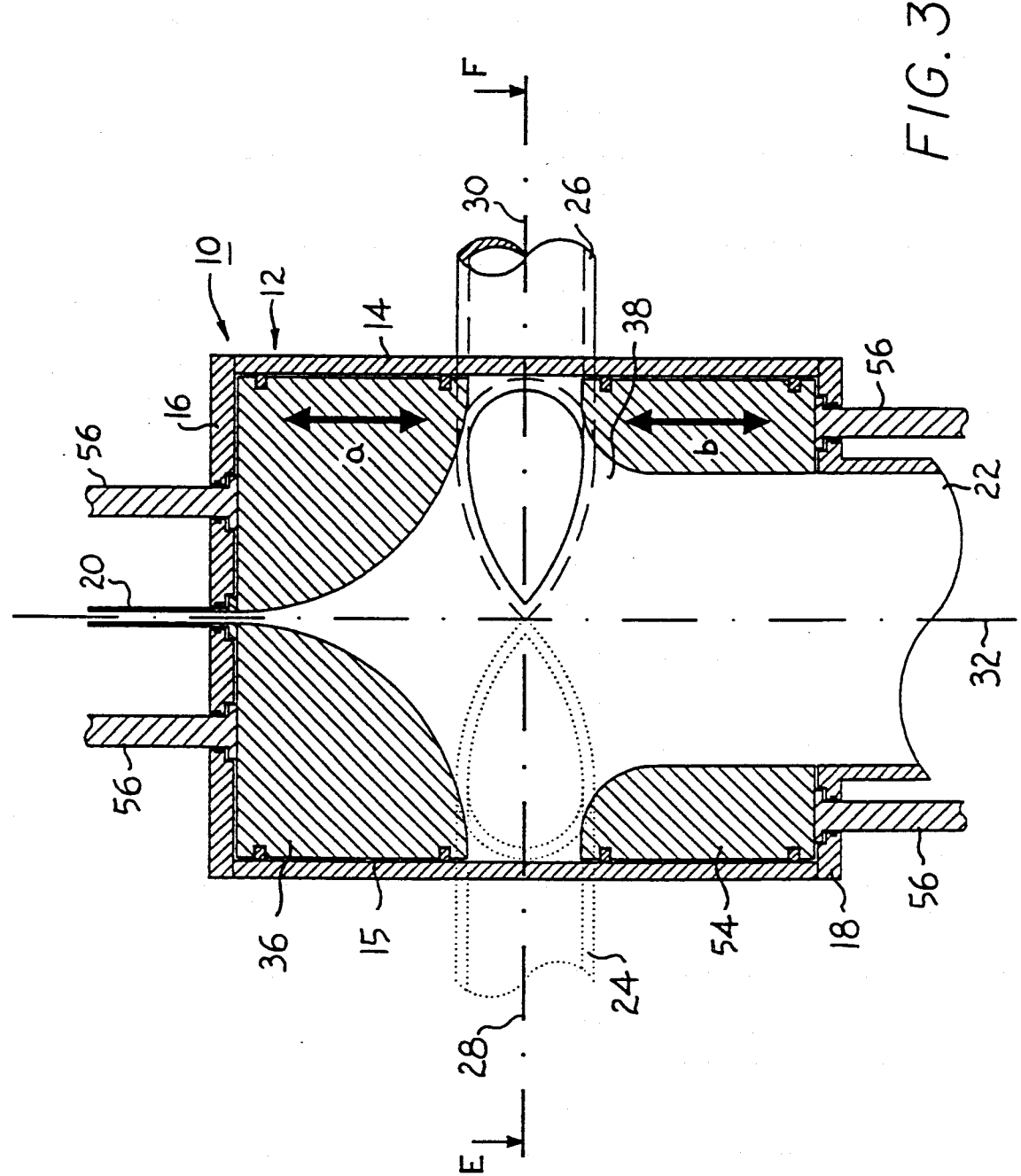
FIG. 3 is a diagrammatic cross section taken through a variation of the vortex chamber atomizer of FIG. 1.
Figure 3A:
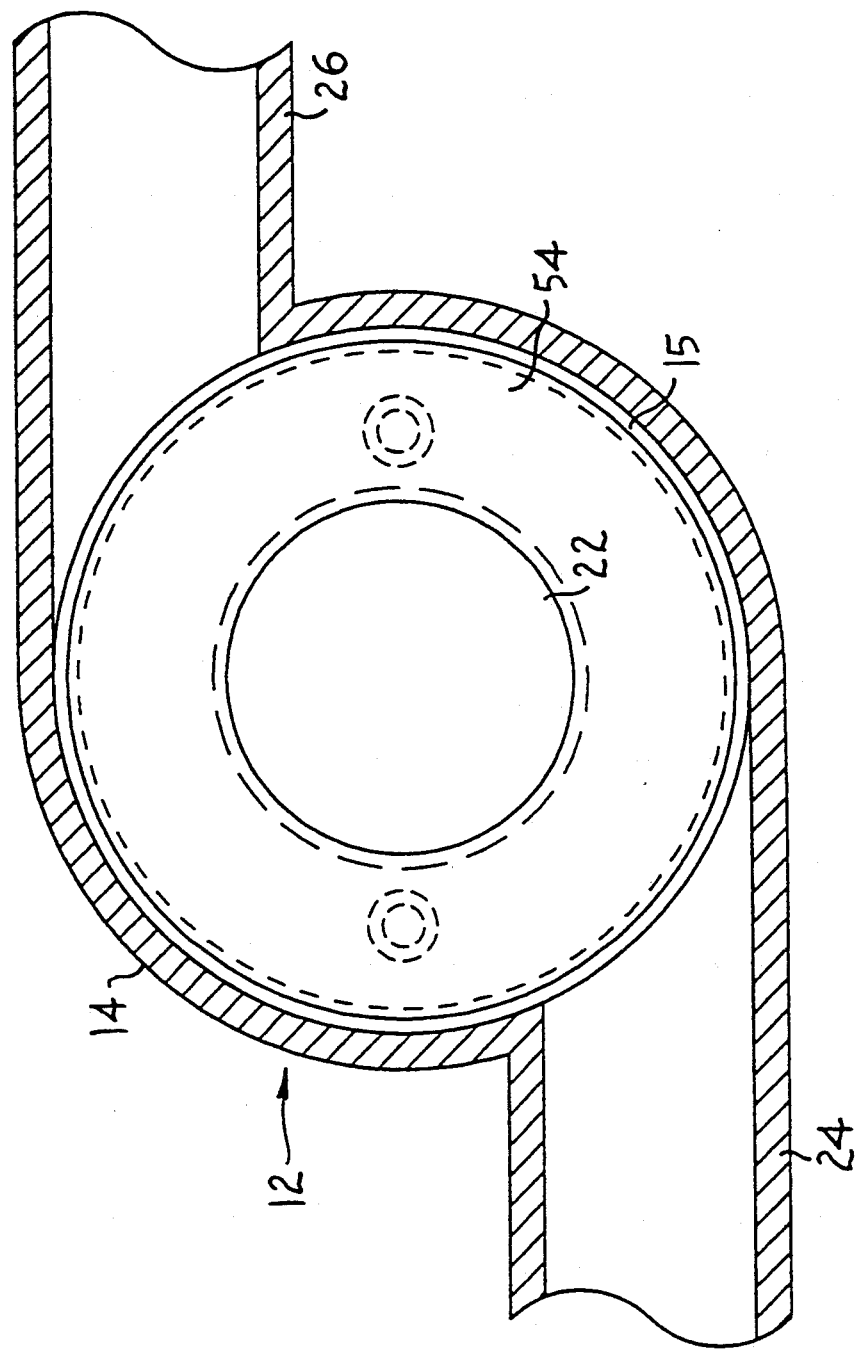
FIG. 3A is a cross-sectional view of the vortex chamber atomizer of FIG. 3 taken along line E-F facing toward the outlet pipe.

The vortex chamber atomizer of FIG. 3 and FIG. 3A is substantially similar to that of FIG. 1 with exception that internal structure 54 between the casing 14 and the outlet pipe 22 may be adjusted axially in the direction of the double arrow denoted as "b" in FIG. 3 by slides 56. Thus, the tubular connectors 24, 26 may be steplessly choked and decreased in cross section by either or both the axially sliding internal structure 36 and 54.

We claim:

1. A vortex chamber atomizer with a housing comprising an axially extending casing and first and second end plates which shut off ends of the casing and of which a first end plate has an inlet nozzle arranged therein and the second end plate has an outlet pipe arranged therein and at least two tubular connectors extend through the casing so that center lines of the connectors are spaced from, and approximately at a right angle to the axis of the housing, characterized in that internal structures are provided in the housing so as to extend from the face of the casing in a circumferential manner so that a cavity is defined in the interior of the housing which is substantially adapted to the form of a primary vortex produced in the vortex chamber atomizer.

2. The vortex chamber atomizer as in claim 1 further comprising a centrifugal chamber.

3. The vortex chamber atomizer as in claim 1 characterized in that the internal structures extend in an edge area between the casing and the first end plate and in that the connectors passing through the casing are arranged so that their openings may be adjustably covered over by an axially sliding cover element.

4. The vortex chamber atomizer as in claim 3 further comprising a centrifugal chamber.

5. The vortex chamber atomizer as in claim 1 characterized in that internal structures are respectively arranged in a first edge area extending between the casing and the second end plate and in a second edge area extending between casing and the first end plate.

6. The vortex chamber atomizer as in claim 5 further comprising a centrifugal chamber.

7. The vortex chamber atomizer as in claim 5 wherein the internal structures extend along the face of the casing as far as the openings of the connectors.

8. The vortex chamber atomizer as in claim 7 further comprising a centrifugal chamber.

9. The vortex chamber atomizer as in claim 5 wherein the center lines o the connectors are in a common center plane intersecting the axis of the housing.

10. The vortex chamber atomizer as in claim 9 further comprising a centrifugal chamber.

11. The vortex chamber atomizer as in claim 5 characterized in that the internal structures arranged in the second edge area are drawn forward as far as the opening of the inlet nozzle along the first end plate.

12. The vortex chamber atomizer as in claim 11 wherein the center lines of the connectors are in a common center plane intersecting the axis of the housing.

13. The vortex chamber atomize as in claim 11 wherein the internal structures extend along the face of the casing as far as the openings of the connectors.

14. The vortex chamber atomizer as in claim 11 further comprising a centrifugal chamber.

15. The vortex chamber atomizer as in claim 5 characterized in that the internal structures arranged in the first edge area are drawn forward along the second end plate as far as the opening of the outlet pipe.

16. The vortex chamber atomizer as in claim 15 further comprising a centrifugal chamber.

17. The vortex chamber atomizer as in claim 15 wherein the internal structures extend along the face of the casing as far as the openings of the connectors.

18. The vortex chamber atomizer as in claim 15 wherein the center lines of the connectors are in a common center plane intersecting the axis of the housing.

19. The vortex chamber atomizer as in claim 15 characterized in that the internal structures arranged in the second edge area are drawn forward as far as the opening of the inlet nozzle along the first end plate.

20. The vortex chamber atomizer as in claim 19 wherein the center lines of the connectors are in a common center plane intersecting the axis of the housing.

* * * * *